April 26, 1938.   G. M. SOULE   2,115,433
DECORATIVE LAMINATED ARTICLE AND METHOD OF MAKING THE SAME
Filed Feb. 5, 1936

INVENTOR.
GEORGE M. SOULE
BY
Bates, Goldrick & Tease
ATTORNEYS.

Patented Apr. 26, 1938

2,115,433

UNITED STATES PATENT OFFICE 2,115,433

DECORATIVE LAMINATED ARTICLE AND METHOD OF MAKING THE SAME

George M. Soule, Cleveland, Ohio, assignor to Oxford Varnish Corporation, Detroit, Mich., a corporation of Michigan Application February 5, 1936, Serial No. 62,493

7 Claims. (Cl. 41—22)

This invention relates to a substantially rigid decorative article having a transparent display sheet, such as glass on one side, and to a novel process of producing such article.

A further object is to provide a rigid decorative unit of the kind above mentioned and particularly one that will not be subject to destructive change under the chemical action of moisture, air and gases normally contained thereby and which will not be subject to destructive change by the action of light.

Another object is to provide a decorative unit, including a glass face member, which unit will be highly resistant to variations in temperature.

A specific object is to provide an improved decorative glass sandwich and novel process of producing the same, particularly one adapted for decoration in representation of natural or artificial patterns, such as wood, marble, tile, animal skins, textile appearances, etc.

The invention is one the order of that disclosed by the copending application of Lloyd V. Casto, Serial No. 45,927, filed October 21st, 1935, owned by the assignee hereof, and is characterized particularly in that the decorative treatment is especially adapted to be subjected to a firing or sintering operation, sufficient to substantially homogeneously unite part or all of the decorative treatment with the glass, to the end that the decorative treatment will remain substantially without change throughout the life of the glass, and will not be subject to pulling away from the glass and/or other destructive changes, commonly experienced in connection with so-called non-splintering glass.

The invention contemplates the utilization, in a decorative glass sandwich, of vitreous or non-vitreous enamels and/or color materials, applied to the glass, as will be hereinafter described, and subject to treatment to sinter or fuse the same to render them chemically inert or substantially so under ordinary conditions of use.

Figure 1:
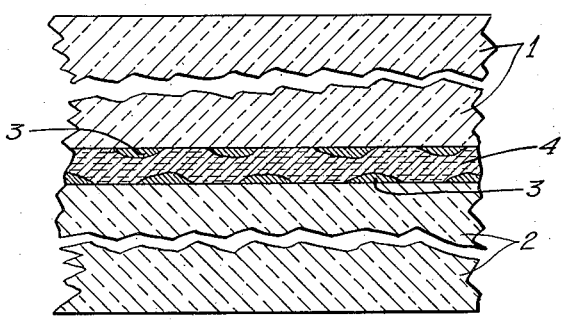
Figure 2:
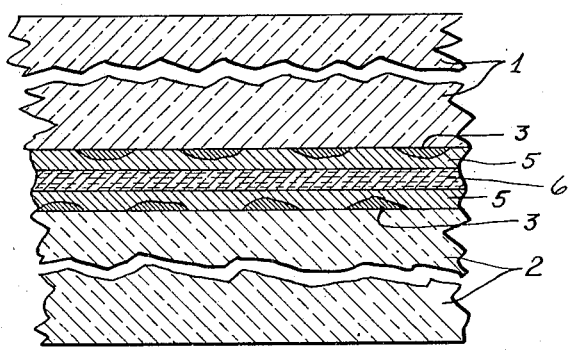
Figure 3:
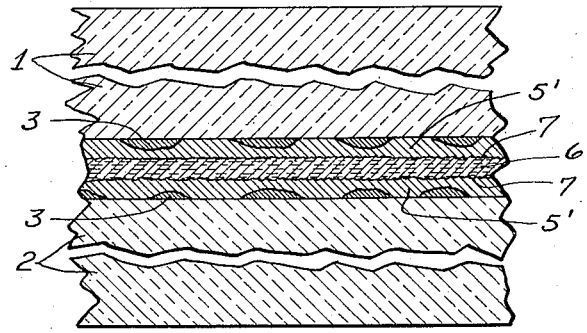

Exemplary embodiments of the invention are shown in the accompanying drawing, Figs. 1 to 3 of which each represents an enlarged cross-sectional view of a section of a completed composite panel.

While all these figures show a two-way view panel, that is, reversible so that either side may be exhibited to advantage, the invention is in no way limited to this arrangement since, in general, it may be practiced substantially without change in producing single-face-display panels.

Referring to Fig. 1, sections of two glass sheets are shown at 1 and 2, an open design transfer is indicated at 3, and a bonding and/or ground color intermediate body layer is shown at 4.

The transfer 3 preferably comprises the class of material embracing vitreous and non-vitreous enamels adapted to be fired or sintered onto the surface of the glass by the application of heat, as in a furnace or oven.

The surface of the glass on which the transfer is applied may be rough (as frosted) say for light diffusing, or enhancing the bond, or substantially smooth as with ordinary plate and window glass, and this selective variation applies to all forms. A frosted or granular appearance or surface may be used to advantage in representing lithic materials such as stone or marble and likewise in representing certain types of wood, the ground appearance of which appears on close observation to be granular.

The body 4 ordinarily contains the proper color component to serve as a background for the tracery effect at 3. This body may be of vitreous material or plastic or semi-plastic material, depending somewhat upon the contemplated use or environment of the completed article. For example, the body 4 may comprise a material such as an asphalt base paint, with the admixture of proper coloring matter, etc. when necessary, to produce the desired background effect. In this form the body 4 acts as a cushion between the two glass sheets 1 and 2, and also as an effective sealing agent throughout the entire laminated surfaces and at the edges. If a comparatively thick layer of such plastic material is employed, this will, at all marginal edges, become substantially hard, but will remain plastic over the intermediate areas.

Alternatively, the body 4 may comprise ceramic materials, the laminating being done as by coating one or both of the decorated panels (in case of a two-way view sandwich) with the raw (plastic) color e. g. material and the panels then brought together and the whole assemblage then subjected to the proper degree of heat to fuse or sinter the body 4 and/or the decorative treatment 3. If the body 4 is of vitreous or non-vitreous enamel and the design transfer 3 is similar to the material 4 in operative effect, the entire composite sheet may be fired or baked, so that the composite body becomes a substantially rigid unit adapted to resist chemical and other destructive agents, such as above mentioned. This requires no special edge seal. In case of using vitreous decorating materials those of low fusion point are recommended,—say masses rich in lead.

It is to be understood that the body 4, may be translucent or transparent or opaque; and may contain any desired pigment or coloring matter suited to its type, examples of vitrious materials being given herein, below, the same being also applicable in connection with the transfer or transfers 3.

The body 4 and/or decorative transfer 3 may also contain suitable flake material such as metal flake or powder in natural state. Moreover, either may contain an insufficient amount of pigment or color material to prevent the viewing of both design transfers 3 through a single sheet, such as above described, this being of distinct advantage where a different design is applied to each glass sheet, such arrangement giving depth and changeability of appearance to the panel when viewed from various angles. The design treatments 3 in such event are preferably different designs or if the same then definitely offset from each other, as by reversal of position, to avoid near registration or "dizzy" effects.

It should be mentioned that the open design transfer 3 may be applied in the manner of applying graining paste in wood and other natural pattern graining methods. For instance, this may be done in accordance with the patent to J. P. Henry, No. 1,548,465, issued August 4th, 1925, or for further illustration according to the patent to R. F. Brown, No. 1,685,396, issued September 25th, 1928. Other suitable definite transfer processes, such, for example, as offset lithography and decalcomania, (as in china decoration), may also be used. For the open design treatment the surface of the glass may be etched through a suitable resist and the color applied over the entire surface but being retained only in the etched area. Lusterization and iridescent effects, when and if desired, are obtained as in china and glass decoration, various methods being well known.

Referring to Fig. 2, this illustrates the decorative design transfers 3, over which there is applied (on each one, for example), vitreous or non-vitreous enamel material 5, fired or sintered on as determined by the material used, the two sections so built up as rigid units being united either by fusing or sintering the two bodies 5 together (or by fusing or sintering one body to a glass sheet, in case of a one-way view sandwich) or by the interposition of a separate bonding layer of material, such as 6 between the two layers 5. The layer 6 may be plastic or rigid, (as above described, in respect to the layer 4), in the finished article. The layers 5 may contain the proper ground color or component or both layers 5 may be transparent or highly translucent and the effective or predominant ground color furnished by the layer 6, by the use of appropriate pigment or dye contained therein.

Fig. 3 illustrates an arrangement similar to that of Fig. 2, and in addition, specifically, the employment of a rough, crystalline or granular surface at 7, on the underside of the coating such as 5', which is laid over the design transfer on the glass. This may be the same on each panel as indicated, and the roughening treatment may comprise frosting, (etching e. g.) sand-blasting or the like, or the well-known wrinkled finish may be effected in applying each or either layer 5'. In the event the coating 5' is substantially transparent or highly translucent, such wrinkled finish imparts a granular or crystalline effect to the ground and/or design color, it being understood that the design transfer 3 may also be pervious to reflected light to any desired degree.

As indicated above, the selection of decorative materials for the various described imprints and coatings is determined in accordance with the character of the glass sheets composing the face layers of the sandwich and the character of design desired to be displayed by said glass. It is common knowledge that some glass bodies will discolor and/or warp at lower temperatures than others. However, in order that the use of the invention will not be confined to specially selected glass, I, propose, generally, to use colored enamels containing active fluxes, such as borates of lime and lead, ground and suspended in suitable vehicles, such as varnish or drying oil for application to the glass or over a previous decorative imprint or transfer thereon.

For the reproduction of oak, as a specific example, one uses for the designs imprints 3, brown or black producing colors such as ferric oxide with zinc, nickel or cobalt oxides as toning agents, in case of a brown; or cobalt oxide with ferric oxide, manganese oxide etc., in case blacks and near blacks are desired. Then as a suitable ground color 4, 5 or 5', e. g. this being generally yellow is obtainable by using barium chromate, lead chromate, uranium compounds etc., with or without toning shades depending on the color of the wood e. g., sample to be copied or simulated. The fluxes for said colors are variously prepared, as well known in the ceramic arts. Examples may be found in the text "Glass Technology" (Hodkin and Cousen) 1935 edition page 413.

The fusing or sintering treatment is carried out as usual in a suitable kiln at appropriate heats and, particularly when the color materials are to be reduced to true glazes, the glass sheet or sheets are re-annealed on cooling down the kiln.

I claim:—

1. The process of producing a decorative glass sandwich comprising applying to one face of a glass panel a decorative treatment of translucent ceramic color material, firing or sintering said material, and roughening the back of the fired material to impart thereto, when viewed through the opposite face of the panel, a granular appearance.

2. In a laminated decorative article of the class described, a glass panel, a decorative coating on the back of the panel igneously bonded therewith and at least partially translucent, the back of the coating being granular for diffusing light reflected through the translucent portion thereof and through the panel.

3. In a laminated article of the class described, two glass panels, an open design transfer and ground color coating on each, igneously bonded to the respective glass surfaces and a laminating bonding sheet attaching said panels together.

4. In a decorative glass sandwich, two glass panels, an open design in color material and a translucent layer on each, said layers having appearances contrasting with the respective designs and igneously bonded with the respective glass surfaces, and an intermediate bonding layer having a color perceptible through the respective translucent layers and panels.

5. The process comprising applying an open design tracery in color material of the ceramic type on one side of a display glass panel, igneously bonding the material thereto and igneously bonding a rigid body layer having a color contrasting with said tracery to said panel for visibility thereof through the display glass panel.

6. The process comprising applying an open design comprising sinterable or fusible color material to one face of a glass panel, applying a sinterable or fusible ground color coating over the design, subjecting the whole to a temperature sufficiently high to sinter or fuse the color material and unite the same with each other and fuse them to said panel, and attaching another glass panel to the decorative treatment and causing said panel to adhere with less force than does the decorative treatment to the first glass panel.

7. The process of producing a decorative sandwich, including a glass facing, comprising applying decorative treatment including an open design and contrasting background, one application comprising sinterable or fusible color material, to one surface of a substantially transparent display glass panel, subjecting said material to sintering or fusing heat, attaching a rigid backing panel to the back of the decorative treatment, and causing the latter panel to adhere thereto with less force than does the sinterable or fusible color material to the display glass panel.

GEORGE M. SOULE.